United States Patent [19]

Kim et al.

[11] Patent Number: 5,199,020
[45] Date of Patent: Mar. 30, 1993

[54] OPTICAL HEAD USING AN OPTICAL SCANNER

[75] Inventors: Young W. Kim; Seung T. Jung, both of Seoul; Keun C. Kim, Kyonggi-Do, all of Rep. of Korea

[73] Assignee: Samsung Electronics Co., Ltd., Kyonggi-Do, Rep. of Korea

[21] Appl. No.: 591,092

[22] Filed: Oct. 1, 1990

[30] Foreign Application Priority Data

Sep. 30, 1989 [KR] Rep. of Korea ............... 89-14242

[51] Int. Cl.$^5$ ............................................. G11B 7/135
[52] U.S. Cl. ............................. 369/112; 369/44.18
[58] Field of Search ............. 369/111, 112, 32, 44.16, 369/44.17, 44.18, 44.11, 44.12, 44.14, 44.25, 44.41; 365/215, 234

[56] References Cited

U.S. PATENT DOCUMENTS

| | | | |
|---|---|---|---|
| 4,298,974 | 11/1981 | Tsunoda | 369/111 X |
| 4,379,612 | 4/1983 | Matsuoka | 369/112 X |
| 4,521,680 | 6/1985 | Ando | 250/201 |
| 4,764,912 | 8/1988 | Ando et al. | 369/45 |
| 4,768,179 | 10/1988 | Gottfried | 369/44.17 X |
| 4,959,824 | 9/1990 | Ueda et al. | 369/112 |
| 4,969,137 | 11/1990 | Sugiyama et al. | 369/32 X |

*Primary Examiner*—Aristotelis Psitos
*Assistant Examiner*—Muhammad N. Edun
*Attorney, Agent, or Firm*—Cushman, Darby & Cushman

[57] ABSTRACT

An optical head for optical storage, having an optical scanner for scanning a laser beam in a recording region, an objective lens of large aperture for collecting all scanned laser beams, and a method for detecting and correcting the focus error and tracking error, a light source and photodetector, in which the objective lens is fixedly set up and the photodetector is placed at the conjugate point of the focal point of laser beam on the recording media. The laser beams reflected from the media are always collected at the center of photodetector, out of relation to the scan angle, thereby reading uniformly the information from the recording media and it is not necessary to move the objective lens. Therefore, access time can be very short.

5 Claims, 5 Drawing Sheets

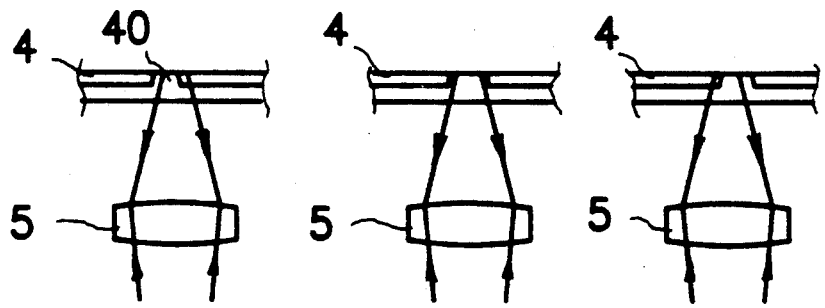
Fig.3a (PRIOR ART) Fig.3b (PRIOR ART) Fig.3c (PRIOR ART)
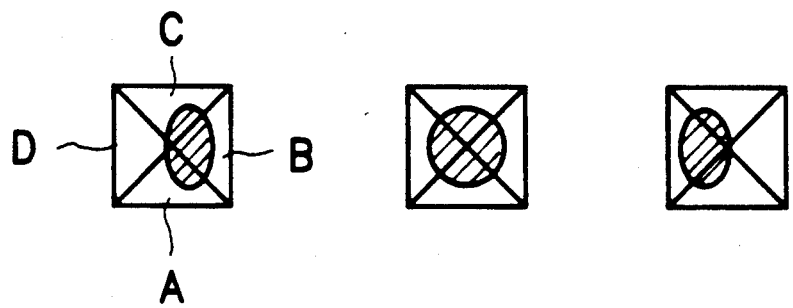
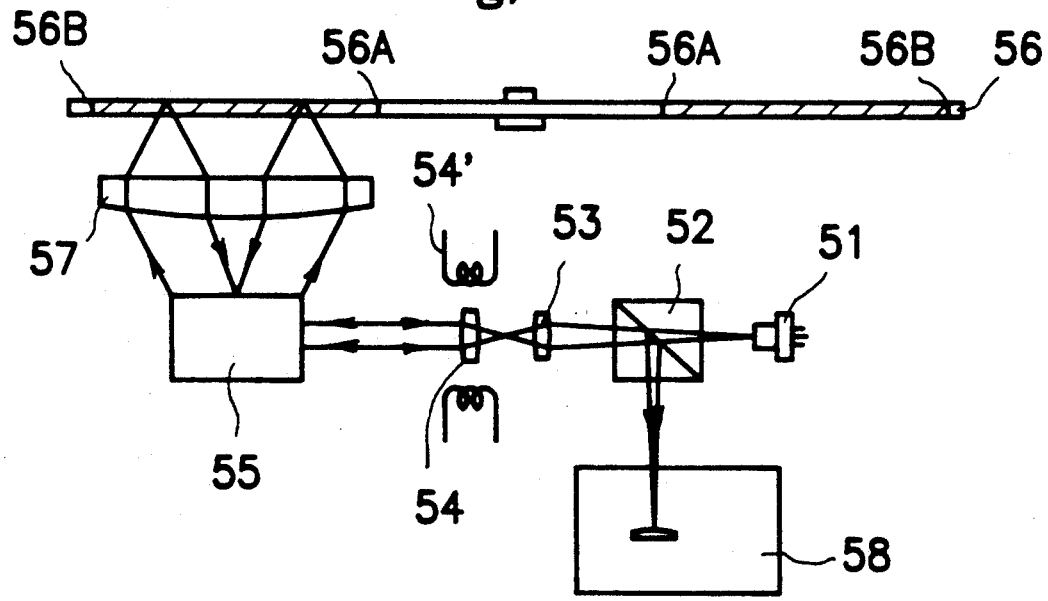
Fig.4

OPTICAL HEAD USING AN OPTICAL SCANNER

BACKGROUND OF THE INVENTION

1. Field of the Invention

The present invention relates to an optical apparatus for reading and/or writing information on a recording medium, such as an optical disk, by means of a light signal, and, more particularly, to an optical head of a fixed type in which the optical apparatus itself does not move between different radial positions of the disk, but only a laser beam moves.

2. Description of the Prior Art

Methods by which information is recorded on and reproduced from recording media are classified roughly into magnetic recording methods and optical recording methods.

In a magnetic recording method, the magnetization direction of magnetic material positioned at the surface of a disk or other substrate is changed electromagnetically, whereby information is recorded and can be reproduced. The recording density in such magnetic recording method is only about 100,000 bits/cm$^2$.

In contrast, the recording density in present optical recording methods is high, e.g., one million bits/cm$^2$. Thus, an optical recording method has an advantage compared with a magnetic recording method in permitting recording and reproduction of a large amount of information.

For optical recording and reproducing of information, a conventional optical head has been used which is illustrated in FIG. 1. The conventional optical head comprises a semiconductor laser 1, a partial reflecting mirror 2 through which light passes from the semiconductor laser 1, a condensing lens 9 by which light rays from the partial reflecting mirror 2 are maintained parallel, an objective lens 5 by which light from the condensing lens 9 collects and is radiated to the search portion on the disk 4, a cylindrical lens 6 by which light reflecting from said partial reflecting mirror 2 collects, and an optical detector 7 on which light passing through said lens 6 is detected.

The laser beam which radiates from the semiconductor laser 1 permeates the partial reflecting mirror 2 along the optical axis becomes parallel light rays by passing through the condensing lens 9 and objective lens and forms a focus at the search portion 4a, 4b on the disk.

The laser beam which reflects from such focusing portion reflects again in a predetermined direction from the partial reflecting mirror 2 after passing the objective lens 5 and the condensing lens 3. Then, the laser beam arrives at the optical detector 7 through the cylindrical lens 6 and an electrical current is produced. Therefore, reproduction in accordance with the condition of the focusing portion as it illuminates respective sites on the disk is carried out.

A conventional astigmatism method which is used in detecting the focusing error is explained in relation to FIG. 2. In the case that the shape of laser beam which forms in the optical detector 7 does not have a prescribed shape, an error is produced.

The error is detected as a focusing error of an electric signal. For example, as it is illustrated in FIGS. 2a-2c, an optical detector 7, which is divided into four parts along the diagonal lines, is installed between the first focus (a focus of Z-axis' direction in case the cylindrical lens 6 is not present) and the second focus (a focus of X-axis' direction in case the cylindrical lens 6 is present).

If a focus forms accurately on the disk 4, then the focus of an intersection has the aspect which is illustrated in FIG. 2b. In case the distance between the disk 4 and the objective lens 5 is shorter than the focusing distance, the focusing aspect forms a horizontal oval as it is illustrated in FIG. 2a.

If the distance between the disk 4 and the objective lens 5 is longer than the focusing distance, the focusing aspect forms a vertical oval as it is illustrated in FIG. 2c.

In order that the electric signals of (A+C)−(B+D) which are described in FIG. 2a and FIG. 2b make the aspect which is illustrated in FIG. 2b, the focusing error is corrected by controlling the distance between the objective lens 5 and the disk 4.

A push-pull method which is generally used for tracking is explained in accordance with FIGS. 3a-3c. In case the focus of the laser beam radiates to the tracking groove 4c of the disk 4, the distribution of light intensity forms the aspect which is illustrated in FIG. 3a and FIG. 3c according to the focus inclines toward the right or the left of the tracking groove.

Accurate tracking provides the aspect which is illustrated in FIG. 3b and the electric signals B−D from the optical detector 7 are detected as a tracking error and are corrected.

Signals for error correction are respectively calculated in a servo-circuit and are applied to the focusing coil 8 and the tracking coil 9. Then, the focusing coil 8 and the tracking coil 3 move the objective lens 3 in a direction in which the focusing and tracking error decreases, and continuous adjustments of focus and track are carried out.

In such conventional optical heads, one unit is composed of various optical parts. The various optical parts are actuated by respective motors and are moved to seek positions on the disk for recording, reproducing and searching for information. In accordance with the physical law that the time necessary for accomplishing movement is proportional to the square root of the weight of the object being moved, the time for following a track becomes very long. (For example, the time for following a track is about 100 msec in case of a standard 5.25-inch diameter disk.

Such a long time for following a track is a major factor which hampers the usefulness of the information storage and retrieval device. The portion of objective lens 5 and the receiving and giving portion of light have been operated separately in order that the time for following the track can be improved, and the optical head has been lightened.

In the conventional device, the time for following the track comes to have a limitation that is difficult to decrease, due to the weight of moving parts. The required cost for achieving further reductions in seek time increases because special apparatus has to be prepared in order that the optical head can be moved fast.

SUMMARY OF THE INVENTION

The object of the present invention is to provide an optical head whose ability is effectively realized without moving the optical head and without the apparatus needed in conventional devices for providing for movement of the head.

In order that the above object of the present invention is realized, an objective lens is prepared by which a laser beam can be irradiated to the whole range of track on which is recorded information, on the corresponding radial portion of a disk. A characteristic, of lens is used such that light which reflects from an image point of the lens returns to the objective point. In case that the laser beam is irradiated to the right or to the left of the light axis, the information on all of the recording area of the disk can be read without bodily moving the optical head. Therefore, the problem of moving the optical head is solved.

BRIEF DESCRIPTION OF THE DRAWINGS

The invention is described herein below in greater detail with reference to the accompanying drawings, in which:

FIGS. 3a-3c are schematic diagrams illustrating a known technique for regulation of tracking error in the prior art optical head;

FIG. 4 is a schematic view of an optical head provided in accordance with principles of the present invention;

DETAILED DESCRIPTION OF THE INVENTION

Figure 1:
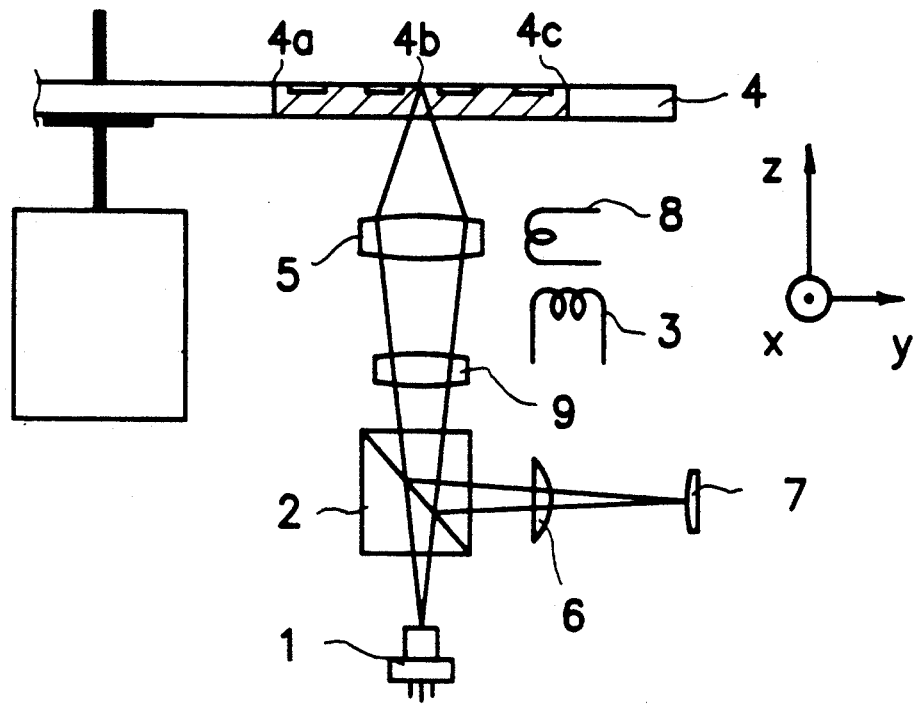
FIG. 1 is a schematic view of a prior art optical head.
Figure 2A:
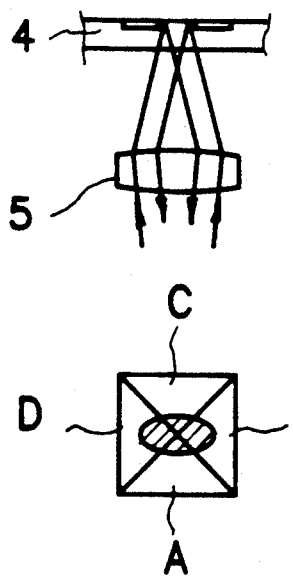
FIGS. 2a-2c are schematic diagrams illustrating a known technique for regulation of focusing error in the prior art optical head.
Figure 2B:
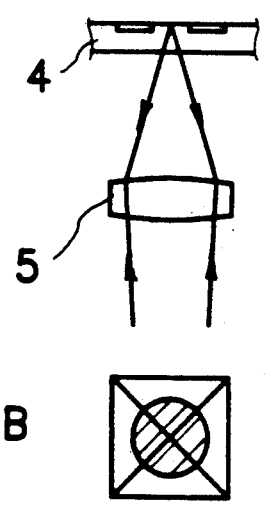
Figure 2C:
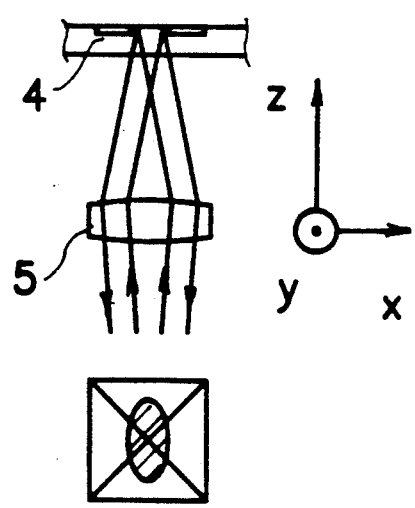
Figure 5A:
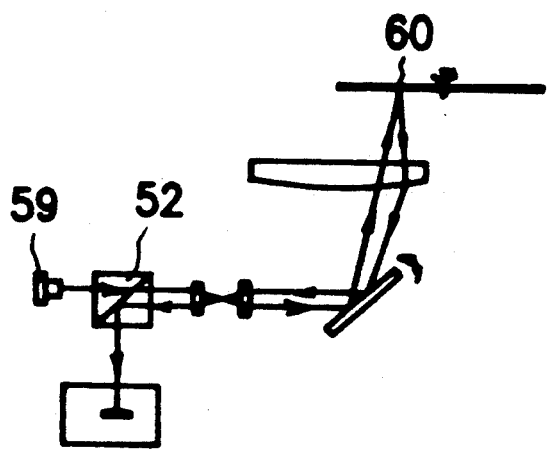
FIGS. 5a and 5b are schematic diagram illustrating the conjugate points of lens.
Figure 5B:
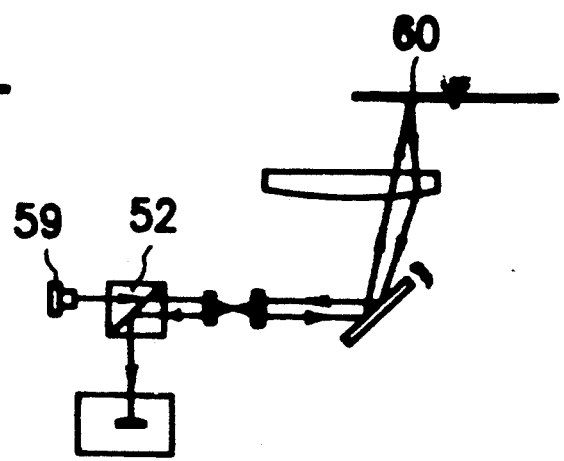

Referring to FIG. 4, there is shown an optical head which comprises a laser diode 51, a partial reflecting mirror 52, a condensing lens 53 for collecting the laser beam from the partial reflecting mirror 52, a regulating lens 54 for correcting focusing error, which actuates by means of focusing coils 54' and corrects the focusing error of the laser beam, an optical scanner 55 which the laser beam of the regulating lens 54 radiates, an objective lens 57 which is set up between a disk 56 for recording and reproducing information and the optical scanner 55, and a member 58 for receiving light reflected from the partial reflecting mirror 52.

The size of the objective lens 57 is selected in order that the innermost and outermost tracks 56A and 56B, respectively, on which the information is recorded or is to be recorded on disk 56 can be covered.

The characteristic of the lens used here is such that light reflected from the image point 60 returns to the objective point 59. The laser beam radiated by laser diode 51 arrives at the disk 56 through the partial reflecting mirror 52, the condensing lens 53, the regulating lens 54 for focusing error, the optical scanner 55, and finally the objective lens 57. The laser beam as the signal of information recorded on and reflected from the disk 56 is detected at the member 58 for receiving light through the objective lens 57, the optical scanner 55, the regulation lens 54 for focusing error, the condensing lens 53, and finally the partial reflecting mirror 52.

Especially, if the distance from the partial reflecting mirror 52 to the laser diode 51 and the distance between the optical detectors in the member 58 for receiving light are retained as the prescribed size, the laser beam reflected from the disk 56 forms again a focus at the optical detector out of relation to the scan angle of the optical scanner 55.

Finally, if the aperture of the objective lens 57 is larger than the distance between the first point 56A, and the last point 56B of the recording track region on the disk 56 and then laser beam from the optical scanner 55 scans to the right or the left around the light axis of the objective lens, the information on the disk can be read out without moving the optical head.

Focusing error can be detected by the known astigmatism method, the known knife edge method, the known critical angle prism method or the known wobbling method. Correction of the focusing error is applied to the focusing coil 54A through the servo-circuit of the member 58 for receiving light and the regulating lens 54 for focusing error is moved to provide focus.

Figure 6A:
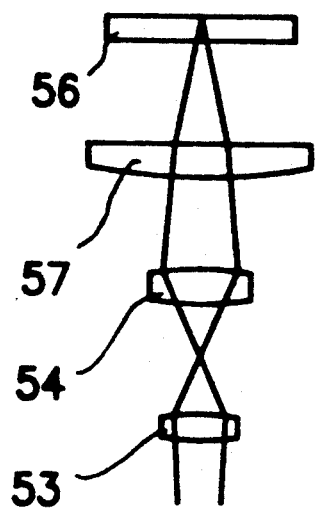
FIGS. 6a-6c are schematic diagrams of the condensing lens of the prior art optical head, for illustrating regulation of the focusing error.
Figure 6B:
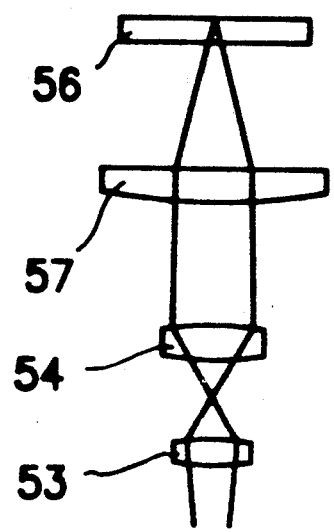
Figure 6C:
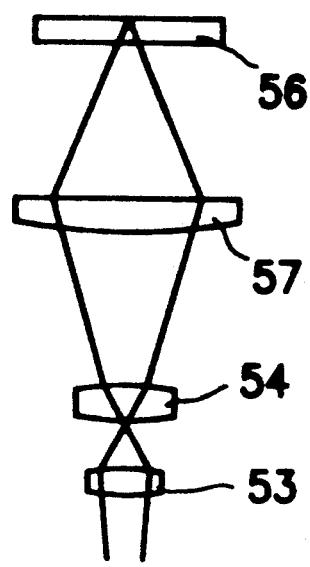

That is, if the disk 56 becomes located too far from the objective lens 57 as illustrated in FIG. 6a, the distance between the disk 56 and the objective lens 57 becomes shorter and the distance of the image point becomes longer. If the disk becomes located too close to the objective lens 57, the distance of the image point becomes shorter. The focusing error is corrected as illustrated in FIG. 6c so that the focus becomes as illustrated in FIG. 6b.

Meanwhile, conventional methods such as the push-pull method, heterodyne method, wobbling method and three-beam method may be used in the detection process of the tracking error. The correcting process may be realized in the above-mentioned way that signals are applied to the optical scanner through the servo-circuit of the member 58 for receiving light. The correcting process may be realized by the way mentioned above in which signals are applied to the optical scanner through the servo-circuit of the member 58 for receiving light.

Figure 7:
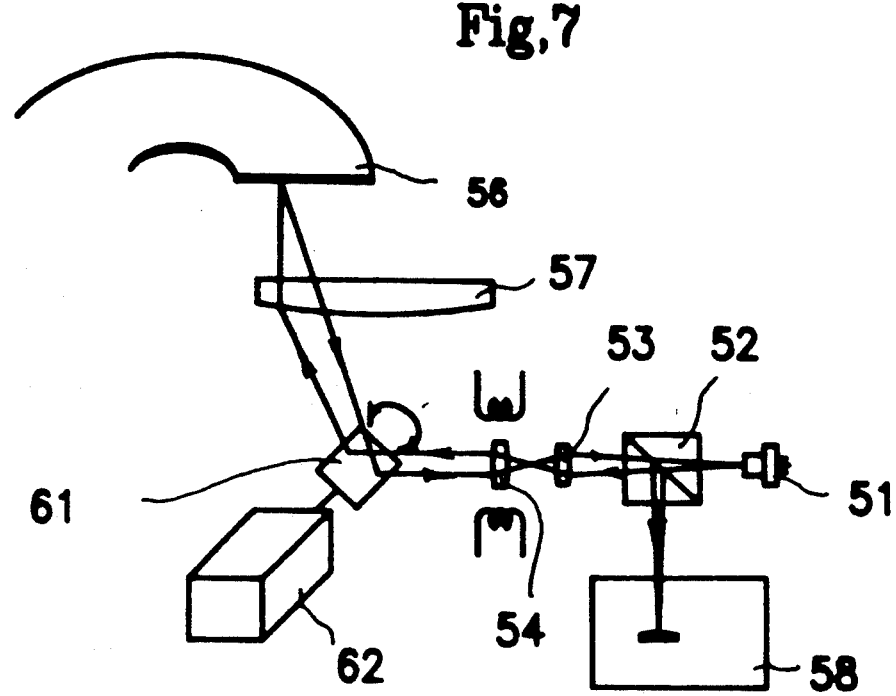
FIGS. 7-9 are schematic diagrams showing the variable applications of the principles of the present invention.
Figure 8:
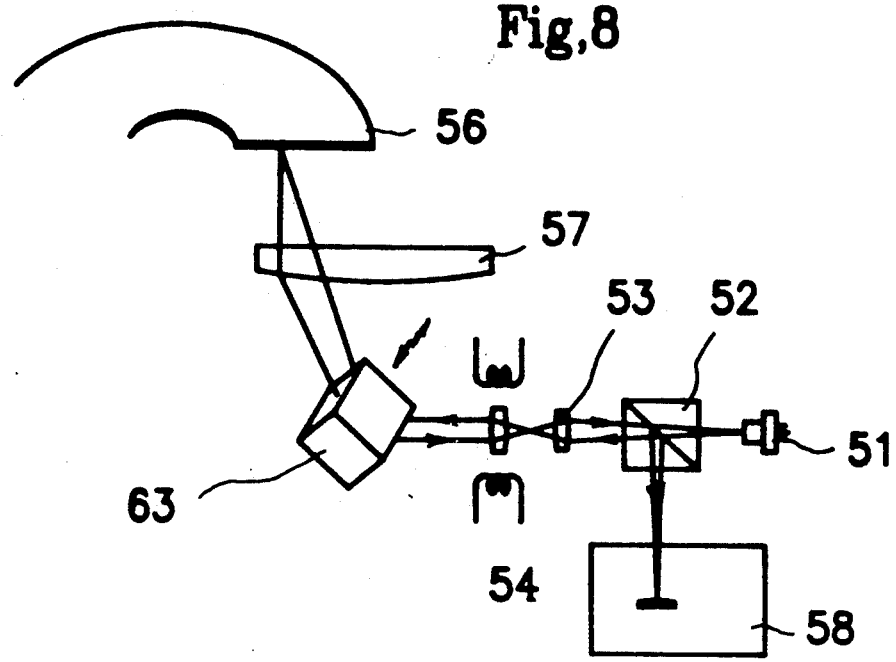

A galvano-mirror 61 and an actuator 62 may be used as the optical scanner 55 as illustrated in FIG. 7, or an acoustic-optical deflector 63 may be used as the optical scanner 55 as illustrated in FIG. 8 in other embodiments of the present invention.

Figure 9:
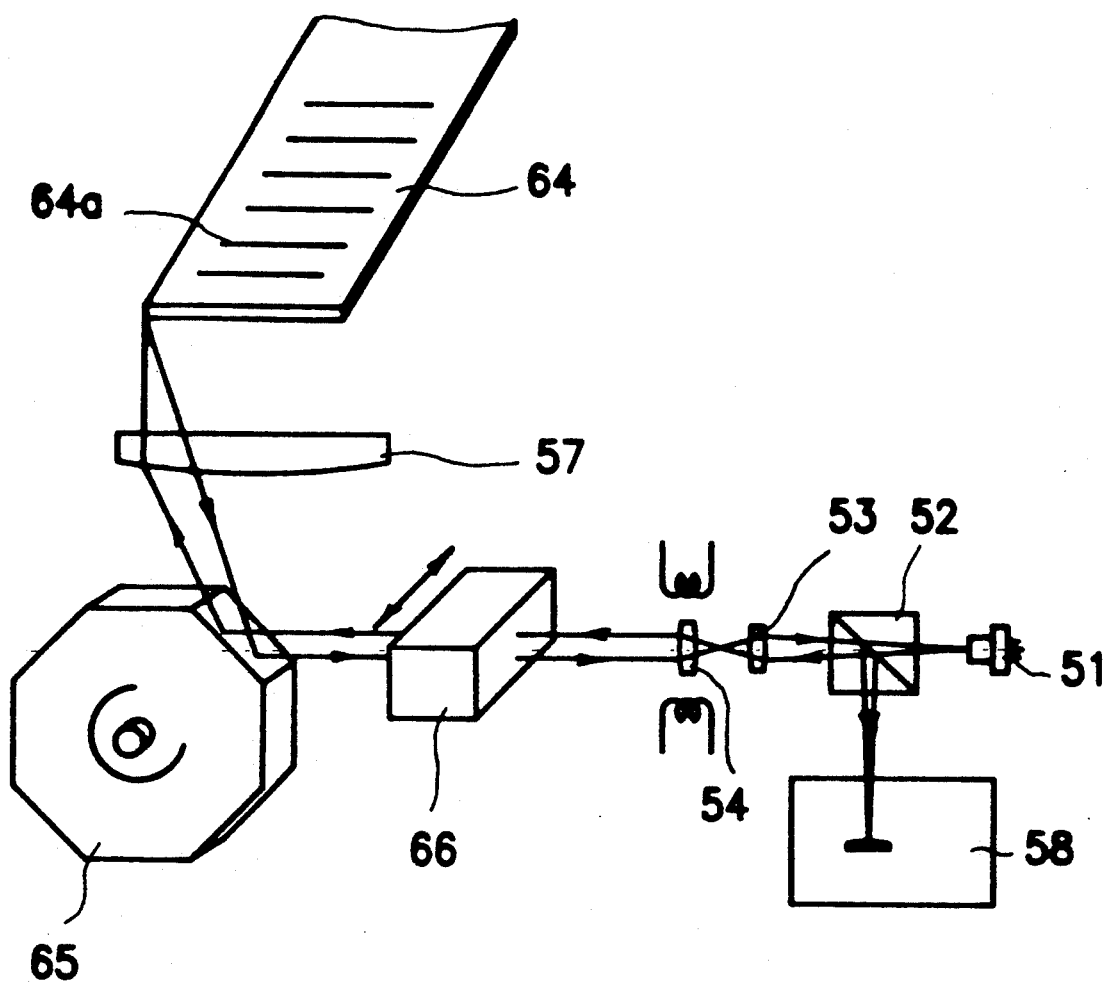

If the track of record medium is set up so as to correspond with the direction of optical scanning like the recording tape 64, the laser beam may be scanned on the track 64a by a rotating mirror 65, the tracking may be done by an acoustic-optical deflector 66 and information recording on and reproduction from a disk may be performed (see FIG. 9).

By using an optical head which has the structure and the function described above, the track accessing time can be made substantially shorter, (100 msec than the conventional optical head and 20 msec than the magnetic head). Because the transfer device which has been specially set up in the conventional optical head is not needed, a decrease of manufacturing cost for optical device is able to be realized.

What is claimed is:

1. An optical head for reading information recorded in an annular region having a radially inner diameter and a radially outer diameter on a face of a disk which is arranged to rotate about the longitudinal axis of the annular region of the disk, said optical head comprising:

a laser beam generating means for providing a laser beam extending along a path;

a partial reflecting mirror interposed in said path for splitting said laser beam into a first portion continuing along said path and a diverted second portion;

a detecting member arranged to be illuminated by said diverted second portion of said laser beam;

a condensing lens interposed in said path for illumination by said first portion of said laser beam for condensing said first portion of said laser beam while passing through said condensing lens;

regulating lens means including a regulating lens interposed in said path for illumination by said first portion of said laser beam for correcting focusing error of said first portion of said laser beam on said annular region of said face of said disk; said regulating lens means further including focusing coil means for shifting said regulating means for correcting said focusing error;

an objective lens interposed in said path of said first portion of said laser beam, said objective lens being selected so as to permit said first portion of said laser beam, when shifted radially of said face of said disk to selectively illuminate all radial increments of said annular region;

an optical scanner interposed in said path of said first portion of said laser beam, between said objective lens and said regulating lens, for scanning said first portion of said laser beam selectively to cause said laser beam, when traveling through said objective lens towards said face of said disk, to illuminate a site at any radial increment of said annular region, and when reflected from said site, to travel back through said scanner, said regulating lens, and condensing lens, and to be diverted by said partial reflecting mirror so as to illuminate said defecting member; and means operatively connecting said detecting member with said focusing coil means of said regulating lens means, for shifting said regulating lens in response to sensing of focusing error by said detecting member; said detecting member being arranged to provide an output signal which corresponds to reflections of said first portion of said laser beam from said site at a succession of moments in time;

said objective lens being fixedly set and having an aperture which collects substantially all laser beams scanned by said optical scanner;

said optical scanner having a scanning direction which is perpendicular to said longitudinal axis about which the disk is arranged to rotate;

said optical scanner having a scanning angle which is so large that scanned laser beams, after passing through said objective lens can irradiate the whole of said annular region of the disk; and the optical detector being so arranged that the optical distance from the disk to said optical detector is substantially equal to the optical distance from the disk to said laser beam generating means.

2. The optical head of claim 1, wherein:

said optical scanner includes:

a first optical scanning means for following any selected radial increment of said annular portion of said face in a first scanning direction lengthwise of such radial increment, and a second optical scanning means for scanning said face in a second scanning direction which is perpendicular to said first scanning direction for providing a focusing error correction input to said detecting member.

3. The optical head of claim 1, wherein:

said optical scanner comprises a galvano mirror operatively connected with an actuator for vibrating said vibrating mirror according to a selected pattern.

4. The optical head of claim 1, wherein:

said optical scanner is an acoustic-optical deflecting-type of optical scanner.

5. The optical head of claim 1, wherein:

said optical scanner is a rotating polygonal mirror-type of optical scanner.

* * * * *